Jan. 8, 1957   R. O. BIRCHLER ET AL   2,776,781
DEVICE FOR FEEDING ARTICLES
Filed Oct. 4, 1951   2 Sheets-Sheet 1
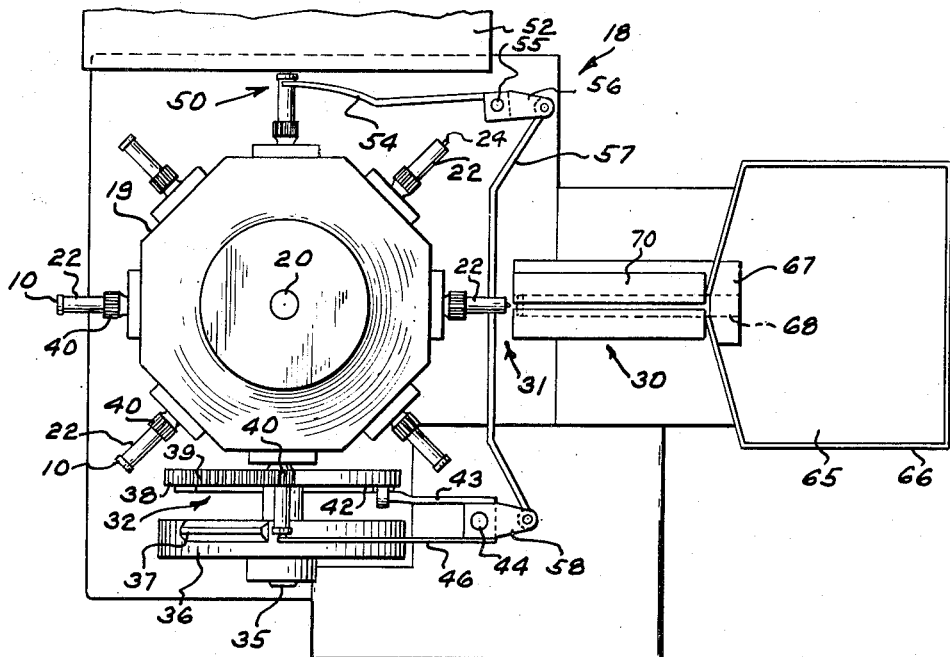
FIG. 1
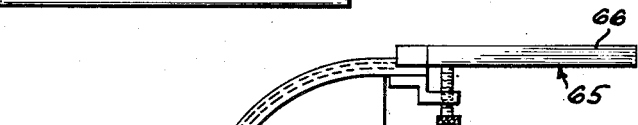
FIG. 2
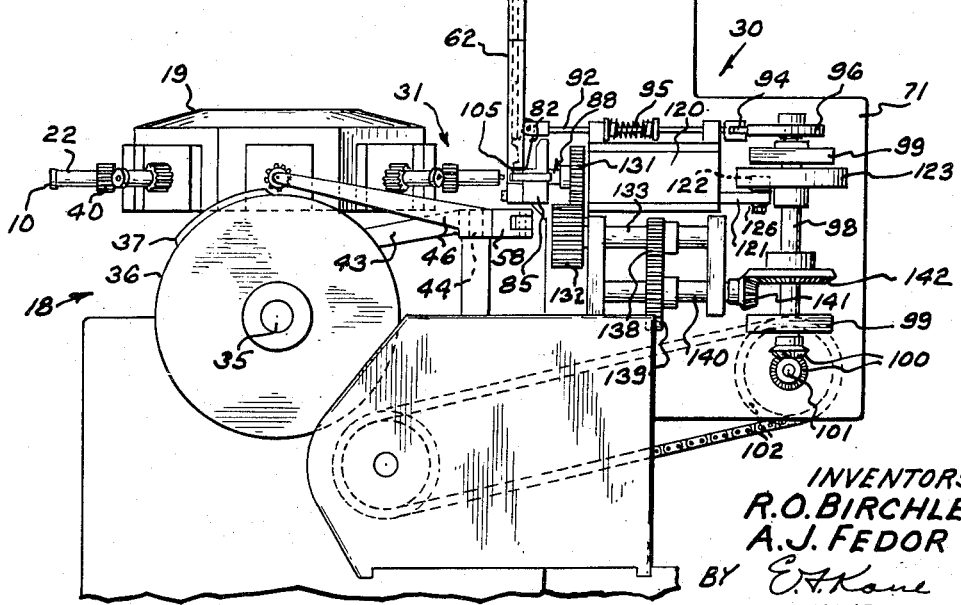
INVENTORS
R.O. BIRCHLER
A.J. FEDOR
BY
INVENTOR

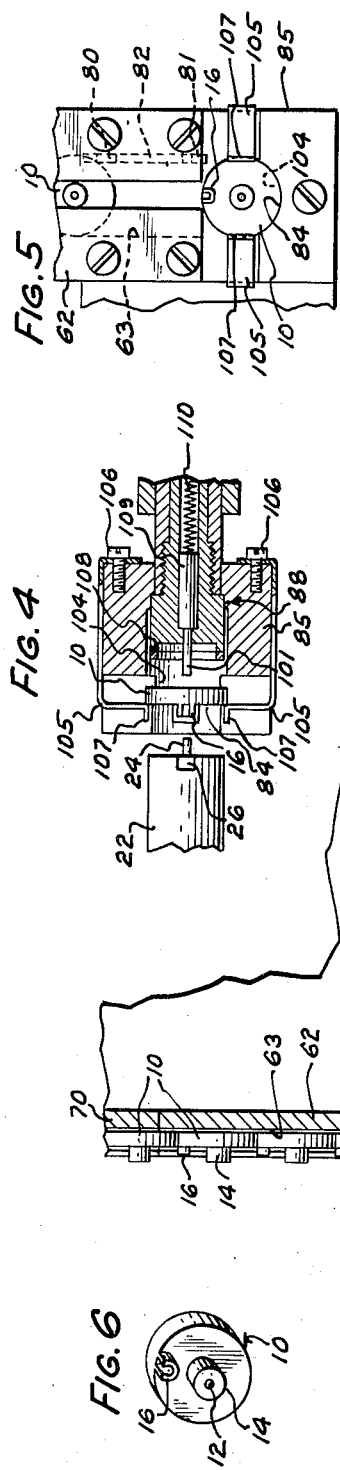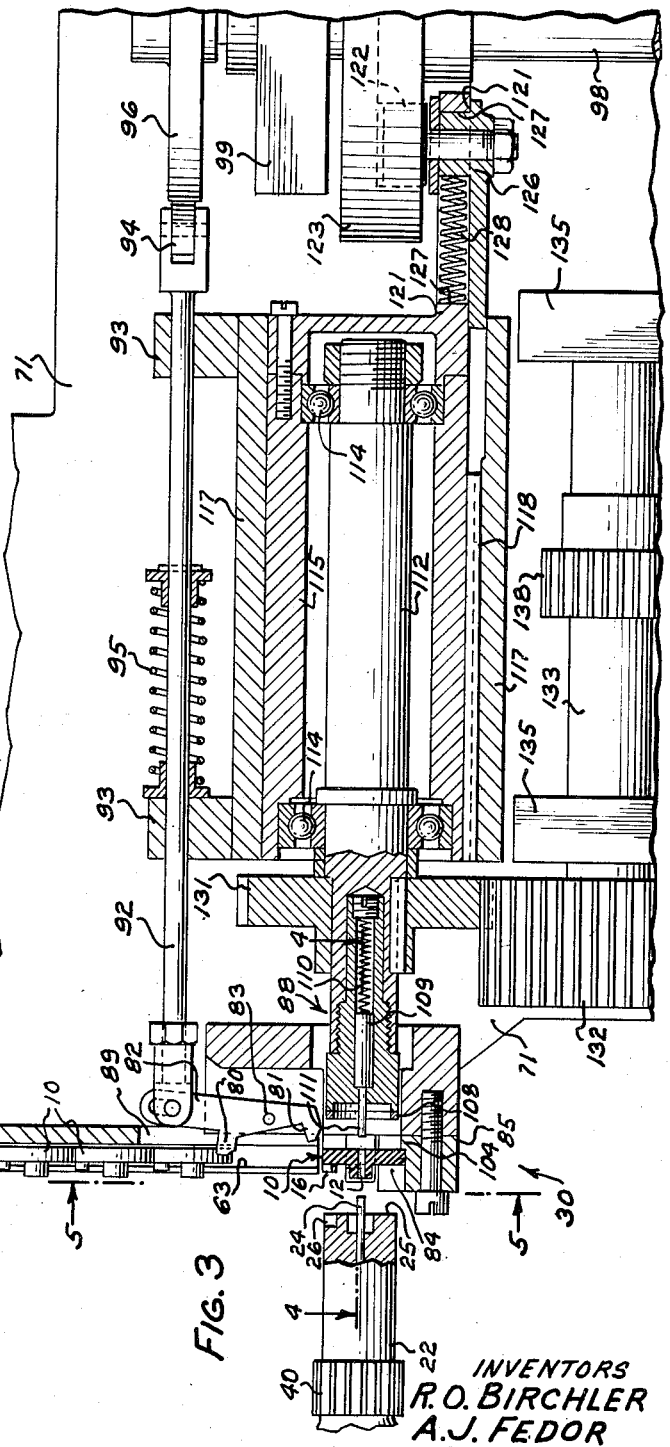

United States Patent Office 2,776,781
Patented Jan. 8, 1957

2,776,781

DEVICE FOR FEEDING ARTICLES

Robert O. Birchler, Cicero, and Andrew J. Fedor, Chicago, Ill., assignors to Western Electric Company, Incorporated, New York, N. Y., a corporation of New York Application October 4, 1951, Serial No. 249,781

9 Claims. (Cl. 221—173)

This invention relates to a mechanism for feeding articles to a machine and more particularly to a device for feeding number wheels onto successive spindles of a marking machine for printing numerals on the number wheels.

One type of the number wheel used in counting or registering devices has a cylindrical periphery which is coated with a background coating material of one color on which the numerals are printed. Molded from plastic material, the wheels usually are provided with several teeth formed on one face thereof adjacent the periphery, which teeth, upon completion of one revolution of the wheel in the counting device, serve to engage and actuate other gears of the counting device. It is essential that the numerals printed on the number wheel be applied thereto in a predetermined angular relation relative to the pair of teeth on the face of the gear and that the wheel be positioned on the spindle in the printing machine in a predetermined angular relation thereto.

It is an object of the present invention to provide a simple device for feeding articles to processing machines or the like with a predetermined portion of the article in a predetermined position.

Another object of the present invention is to provide a simple device for feeding number wheels or similar articles to marking machines or the like with a predetermined portion of the wheels in a predetermined angular relation to the axis thereof.

In one embodiment of the feeding mechanism, as applied to a turret-type marking machine having a plurality of spindles for rotatably receiving the wheels at a loading station and advancing them to a printing station where the numerals are printed on the periphery of the wheels, and the spindles, which are each provided with a recess in the end face thereof for receiving a lug projecting from one face of the wheel, a chute is provided for guiding a column of wheels into engagement with an escapement feed which drops successive wheels onto a seat in predetermined position in alignment with a spindle at the loading position of the marking machine and in axial alignment with a feed plunger. The feed plunger is reciprocable in timed relation with the actuation of the marking machine to advance successive wheels onto successive spindles and the feed plunger is rotated to turn the wheel and cause the lug on the forward face thereof to align itself with and enter into the recess in the spindle to accurately position the wheel on the spindle in a predetermined angular position.

Other objects and advantages of the invention will become apparent by reference to the following detailed description thereof when considered in connection with the accompanying drawings illustrating a preferred embodiment thereof, in which Fig. 1 is a plan view of a marking machine for printing numerals on number wheels and the feeding device applied thereto;

Fig. 2 is a side elevational view of the apparatus shown in Fig. 1;

Fig. 3 is an enlarged vertical longitudinal sectional view of a portion of the feeding device;

Fig. 4 is a detailed plan sectional view taken on the line 4—4 of Fig. 3;

Fig. 5 is an elevational view of a portion of the device indicated by the line 5—5 of Fig. 3; and Fig. 6 is an enlarged perspective view of one of the number wheels.

Referring to Fig. 6 of the drawings, 10 indicates one type of number wheel which is used in counting or registering devices and onto the cylindrical periphery of which the numerals are to be printed. The wheel has a central bore 12 and a hub portion 14 and a lug or pair of gear teeth 16 on one face adjacent the periphery thereof. The peripheral surface of the wheel has applied thereto a coating of one color forming a surface onto which the numbers of a contrasting color are printed.

The marking machine 18 for printing the numerals on the number wheels comprise a turret head 19 which is mounted on a shaft 20 for rotation about a vertical axis and has a plurality of spindles 22 extending outwardly therefrom. The spindles 22, which are rotatably supported in the turret head and are yieldably held against rotation, are provided at their outer portions with reduced ends or pins 24 adapted to fit in the bore 12 of the wheels to support the wheels on the spindles. The front face of the wheel 10 will engage the end face 25 of the spindle 22 and the lug 16 on the wheel will fit into the recess 26 formed in the outer end of the spindles for positioning the wheel in a predetermined angular position relative to the marking machine.

Successive wheels 10 are fed onto successive spindles 22 by the feeding device 30 at the loading station 31 and as the turret is indexed, the spindles and wheels are carried to a printing station 32 where the numerals are printed on the periphery of the wheels. A shaft 35, positioned below the spindle and in vertical alignment therewith, is driven in timed relation to the actuation of the turret and has a printing wheel 36 fixed thereto on a portion of the periphery of which is mounted a plate 37 for printing the numerals on the wheels 10. The plate 37 is inked by suitable means not shown. Also fixed to the shaft 35 is a disc 38 having a segmental gear 39 which meshes with gears 40 formed on each of the spindles 22 for imparting rotation to the spindle and the wheel 10 thereon to positively rotate the wheel during the printing of the numbers thereon.

A cam 42 mounted on one face of the disc 38 actuates a cam lever 43 mounted for oscillation about a vertical pin 44 suitably supported on the marking machine 18. An arm 46 mounted for oscillatable movement with the cam lever 43 has its end portion disposed opposite the end of the spindle for engagement with the end of the wheel and serves to hold the wheel on the spindle during the printing of the numerals thereon. After the numerals have been printed on the wheel, the wheel is carried by the spindles through several idle stations to an unloading station 50 where the wheels 10 are ejected into a magazine 52 by an arm 54. The arm 54 is mounted for pivotal movement about a pin 55 and is connected through a lever 56, a link 57, and an arm 58 to the cam lever 43 for movement therewith. The magazine device 52 is disclosed and claimed in the co-pending application of R. O. Birchler and A. J. Fedor, Ser. No. 249,782, filed October 4, 1951.

The feeding device 30 comprises a vertically disposed feed chute 62 having a passageway 63 therein for receiving a row of wheels 10 therein in oriented relation with the wheels in edge-to-edge engagement and with the lugs 16 on each wheel disposed in a slot in the chute and directed toward the turret head 19. Automatically or manually operated means may be provided for filling the feed chute with the wheels 10 in oriented relation to each other. As shown herein a manually operated mechanism is provided comprising a tray 65 for receiving and supporting a supply of the wheels 10 thereon. The tray 65 has an upwardly extending peripheral flange 66 thereon and has removably secured to the top surface thereof a block 67 provided with a slot or passageway 68 for passing the wheel 10 therethrough when the lugs 16 thereon are directed upwardly. The passageway 68 of the block 67 communicates with the passageway of a channel member 70 which has its lower end directed downwardly and is positioned adjacent the feed chute 62 to guide the wheels 10 thereinto. The tray 65 is shown removably secured to the end of the channel guide 70 which is secured to a vertical frame plate 71, which in turn is suitably mounted on the frame of the marking machine 18.

The wheels 10 in the passageway 63 successively engage a pair of fingers 80 and 81 of an escapement member or pawl 82, which is oscillatable about a pin 83 in timed relation to the actuation of the marking machine to feed successive wheels 10 into a recess or seat 84 of a supporting member 85 fixed to the plate 71 and positioned below the chute 62 for positioning and supporting successive wheels 10 in axial alignment with the spindle at the loading station and with a feed plunger 88. The escapement member 82 is mounted in a slot 89 in the chute 62 and the fingers 80 and 81 thereof are alternately moved into and out of the passageway 63. At its upper end the pawl 82 is pivotally connected to one end of a rod 92 mounted for sliding movement in bearing brackets 93—93 and which has a cam follower 94 mounted on its opposite end. A compression spring 95 stresses the rod 92 for movement in one direction to urge the cam follower 94 against a cam 96 which is keyed to a vertical drive shaft 98. The shaft 98 is journalled in bearings 99 mounted on the frame plate 71 and is driven from the printing machine through bevel gears 100, a shaft 101, and a sprocket and chain connection 102 from the marking machine 18.

The seat 84 of the holder 85 is curved and engages the periphery of the wheel 10 through approximately 120° and has a shoulder 104 which engages a portion of the rear face of the wheel to prevent tipping or tilting of the wheel rearwardly or to the right as viewed in Fig. 3. A pair of leaf springs 105 are secured at their rear ends to the holder 85 by screws 106 and are so shaped that the forward end portions 107 thereof are positioned to engage portions of the forward face of the wheel resting in the seat 84 and prevent the wheel from tilting forward. The ends 107 of the springs 105 may be flexed outwardly to permit the movement of the wheels 10 therebetween as the wheels are advanced from the seat 84 onto the spindles 22 and the ends of the spring return to their normal unflexed position behind the wheel to prevent it from returning with the feed plunger 88.

When the wheel 10 is fed by the escapement pawl 82 onto the seat 84 of the member 85 it is positioned thereby in axial alignment with a spindle 22 at the loading station and in axial alignment with the feed plunger 88 which is adapted to be reciprocated and rotated to advance the wheel and transfer it onto the spindle 22 and to rotate the wheel to cause the lugs 16 thereon to enter the aligning recess 26 in the spindle 22.

The forward end of the feed plunger 88 has an annular ring of rubber or other friction material 108 on its front face adapted to engage the rear face of the wheel for imparting rotation thereto. A shouldered rod or pin 109 is mounted for reciprocable movement in an axial recess in the plunger and is urged forwardly by a spring 110 to its normal position with a portion of the reduced end 111 of the plunger extending beyond the end of the plunger. The forward end of the pin 109 is adapted to enter the bore 12 of the wheel to support the wheel during the transfer thereof onto the spindle 22. The plunger 88 has a rearwardly extending shank or shaft 112 which is mounted for rotation in anti-friction bearings 114 which in turn are mounted in a tubular slide 115. The slide 115 is supported for axial reciprocable movement in the bore of a block 117 secured to the vertical frame plate 71 and a spline 118 prevents angular movement of the slide 115. An arm 121 extending rearwardly from the slide 115 supports a cam roller 122 which fits in a cam groove in a cam 123 fixed to the shaft 98 and is actuated thereby to reciprocate the plunger 88 in timed relation with the actuation of the marking machine 18.

A yieldable connection is provided between the cam roller 122 and the plunger 88 to permit the wheel to be lightly pressed against the end of the spindle as the wheel is being rotated. The cam roller 122 is mounted in a member 126, a portion of which is mounted in a slot 127 in the arm 121 for movement with the hollow slide member 115 and for sliding movement relative thereto. A compression spring 128 yieldably maintains the member 126 in its normal position against the end of the slot 127 as shown in Fig. 3.

Secured to the plunger 88 between the member 85 and the slide 115 is a gear 131 which meshes with a gear 132 fixed to a shaft 133 which is journalled in brackets 135 on the vertical frame plate 71. Also fixed to the shaft 133 is a gear 138 which meshes with a gear 139 fixed to a shaft 140 rotatably mounted in the brackets 135—135. The shaft 140 is driven by a pair of bevel gears 141 and 142 from the drive shaft 98. Thus, during the operation of the machine the plunger 88 is rotated as it is reciprocated and the gear 132 is relatively wide to permit the meshing of the gears 131 and 132 during the reciprocation of the plunger.

In the operation of the device with the feed chute filled with wheels 10, the marking machine may be started and in predetermined timed relation to the indexing of the turret the escapement pawl 82 is actuated to cause the lower finger 81 thereof to release the lowermost wheel 10 in the chute while the upper finger 80 engages the following wheel to arrest the movement of the column of wheels thereabove. The wheel 10 which was released comes to rest in the seat 84 in the support 85 in axial alignment with the spindle 22 and the feed plunger 88. The feed plunger, which is continuously rotating during the operation of the machine, is actuated by the cam 123 and moves forwardly during which forward movement the end 111 of the pin 109 enters the bore 12 of the wheel and the forward face of the annular friction member 108 on the plunger engages the rear face of the wheel causing the wheel to rotate with the plunger as the plunger carries the wheel forward between the ends 107 of the spring fingers into engagement with the spindle 22. As the wheel 10 is advanced the pin 24 of the spindle enters the bore 12 of the wheel 10 and engages the end 111 of the movable pin 109 and arrests the forward movement thereof as the wheel advances and the lug 16 thereon engages the face 25 of the spindle and is rotated thereagainst until it registers with the recess 26 and is moved thereinto by the plunger 88. The feed plunger 88 is then retracted, leaving the wheel 10 supported on the pin 24 of the spindle 22. The pin 24 is of the size to frictionally engage the wall of the bore of the wheel and support the wheel on the spindle after the plunger 88 has been retracted. The ends 107 of the spring fingers 105 insure that the wheels 10 after being transferred onto the spindles do not return with the feed plunger 88 on its return stroke. Thus, as successive spindles are advanced to the loading station, successive ones of the wheels 10 are fed into the seats 84 and are transferred therefrom onto the spindles and are advanced by the spindles to the printing station where numbers are applied thereto and then to the unloading station where they are ejected.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for feeding wheels comprising a feed plunger, means supporting said plunger for rotation about an axis in alignment with a spindle onto which said wheel is to be applied and for movement along said axis toward and away from said spindle, means for supporting a wheel in a predetermined position in the path of movement of said plunger, means for feeding successive wheels into said supporting means, means including a yieldable connection for reciprocating said plunger to advance a wheel onto said spindle and yieldably press said wheel against said spindle, means for rotating said plunger to impart rotation to said wheel for effecting the angular alignment and engagement of a lug on said wheel with a recess in said spindle, and means for supporting said wheel during the advance movement thereof.

2. A device for feeding wheels onto spindles which are successively moved to a loading station and are provided each with a recess for receiving a lug on each of the wheels in a predetermined angular position, said feed device comprising a feed plunger, means supporting said plunger for rotation about an axis in co-axial alignment with a spindle at said loading station and for movement along said axis toward and away from said spindle, means for supporting a wheel in a predetermined position in the path of movement of said plunger and in axial alignment therewith, means for feeding successive wheels into said supporting means, drive means operable in timed relation to the movement of said spindles to said loading station for reciprocating said plunger to advance a wheel onto said spindle and for rotating said plunger to impart rotation to said wheel, and means for supporting said wheel during the advance movement thereof.

3. A device for feeding wheels onto spindles which are successively moved to a loading station and are provided each with a recess for receiving a lug on each of the wheels in a predetermined angular position, said feed device comprising a feed plunger mounted for rotation about an axis in co-axial alignment with a spindle at said loading station and for movement along said axis toward and away from said spindle, means for supporting a wheel in a predetermined position in the path of movement of said plunger and in axial alignment therewith, means for feeding successive wheels into said supporting means, drive means operable in timed relation to the movement of said spindles to said loading station for reciprocating said plunger to advance a wheel onto said spindle and for rotating said plunger to impart rotation to said wheel during the advance movement thereof, and means on said plunger for supporting said wheel during the advance movement thereof.

4. A device for feeding wheels comprising a feed plunger, a spindle, means supporting said plunger for rotation about an axis in co-axial alignment with said spindle onto which said wheel is to be applied and for movement along said axis toward and away from said spindle, a shouldered seat for supporting a wheel in a predetermined position in the path of movement of said plunger and in axial alignment therewith, means for feeding successive wheels into said supporting means, means for reciprocating said plunger to advance a wheel onto said spindle, means for rotating said plunger to impart rotation to said wheel during the advance movement thereof, said shouldered seat preventing the tilting rearwardly of said wheels, spring means for yieldably retaining said wheel on said supporting means against forward tilting, and means on said plunger for rotatably supporting said wheel during the advance movement thereof.

5. In a machine having a plurality of spindles for receiving apertured articles wherein the spindles are successively indexed to a loading station and each spindle has a pin projecting from the end face thereof engageable in the aperture of articles to be processed to support the article and each spindle has a recess in the end thereof to receive a lug on the article in a predetermined angular position, the combination therewith of a feed plunger, means supporting said plunger for rotation about an axis in co-axial alignment with a spindle at said loading station and for movement along said axis toward and away from said spindle, means for supporting an apertured article in a predetermined position in the path of movement of said plunger and in axial alignment therewith, means for feeding successive articles into said supporting means, means including a yieldable connection operable in timed relation to the indexing movement of said spindles to said loading station for reciprocating said plunger to advance an article onto said spindle and yieldably press said article against the end face thereof, said plunger having an axial bore and having a friction surface on its end face engageable with the face of said article, a rod yieldably mounted in said bore and having a normal position with one end thereof projecting from said plunger for entering the aperture in said article to support said article during the advance movement thereof, and means for rotating said plunger to impart rotation to said article.

6. In a machine having a plurality of spindles for receiving apertured articles wherein the spindles are successively indexed to a loading station and each spindle has a pin projecting from the end face thereof engageable in the aperture of articles to be processed to support the article and each spindle has a recess in the end face thereof to receive a lug on the article in a predetermined angular position, the combination therewith of a feed plunger mounted for rotation about an axis in co-axial alignment with a spindle at said loading station and for movement along said axis toward and away from said spindle, a member having a shouldered seat for supporting an apertured article in a predetermined position in the path of movement of said plunger, means for feeding successive articles onto said seat, said shouldered seat preventing the tipping rearwardly of said wheel, spring means for yieldably retaining said wheel against tipping forwardly, said plunger having an axial bore and having a friction surface on its end face engageable with the face of said article, a rod yieldably mounted in said bore and having a normal position with one end thereof projecting from said plunger for entering the aperture in said article to support said article during the advance movement thereof, means for rotating said plunger for rotating said article thereon, and means operable in timed relation to the indexing movement of said spindles for reciprocating said plunger to advance an article onto said spindle.

7. In a machine having a plurality of spindles for receiving apertured wheels wherein the spindles are successively indexed to a loading station and each spindle has a pin projecting from the end face thereof engageable in the aperture of a wheel to be processed to support the wheel and each spindle has a recess in the end face thereof to receive a lug on the wheel in a predetermined angular position, the combination therewith of a feed plunger mounted for rotation about an axis in co-axial alignment with a spindle at said loading station and for movement along said axis toward and away from said spindle, a member for supporting a wheel in a predetermined position in the path of movement of said plunger and in axial alignment therewith, a chute for guiding a column of wheels onto said supporting member, an escapement member operable in timed relation to the indexing of said spindles for feeding successive wheels into said supporting member, means operable in timed relation to the indexing movement of said spindles for reciprocating said plunger to advance a wheel onto said spindle, said plunger having an axial bore and having a friction surface on its end face engageable with a face of said wheel, a rod yieldably mounted in said bore and having a normal position with one end thereof projecting from said plunger for entering the aperture in said wheel to support said wheel during the advance movement thereof, and means for rotating said plunger to effect the rotation of said article.

8. In a machine having a plurality of spindles for receiving apertured wheels wherein the spindles are successively indexed to a loading station and each spindle has a pin projecting from the end face thereof engageable in the aperture of a wheel to be processed to support the wheel and each spindle has a recess in the end face thereof to receive a lug on the wheel in a predetermined angular position, the combination therewith of a feed plunger mounted for rotation about an axis in co-axial alignment with a spindle at said loading station and for movement along said axis toward and away from said spindle, said plunger having an axial bore and having a friction surface on its end face engageable with said wheel, a rod yieldably mounted in said bore and having a normal position with one end thereof projecting from said plunger for entering the aperture in said wheel to support said wheel, a member having a shouldered seat for supporting said wheel in a predetermined position in the path of movement of said plunger, said shouldered seat preventing the rearward tipping of said wheel, spring means for yieldably retaining said wheel against forward tipping, a chute for guiding a supply of wheels onto said supporting member, an escapement member operable in timed relation to the indexing of said spindles for feeding successive wheels onto said supporting member, means for rotating said plunger to cause the rotation of said wheel thereon, and means including a yieldable element operable in timed relation to the indexing of said spindles for reciprocating said plunger to transfer a wheel from said supporting member to said spindle and to yieldably press said wheel against said spindle.

9. A device for feeding disks having lugs on one face thereof comprising a plurality of spindles, each having a recess in one end thereof for receiving a lug on said disk, means for intermittently moving said spindles successively to a loading station, a feed plunger, means supporting said plunger for rotation about an axis in alignment with a spindle at said loading station and for movement along said axis toward and away from said spindle, means for supporting a disk in a predetermined position in the path of movement of said plunger, means operable in timed relation to the movement of said spindles for feeding successive disks into said supporting means, means including a yieldable connection for reciprocating said plunger to advance said disk into engagement with said spindle and yieldably press said disk against said spindle, means for rotating said plunger to impart rotation to said disk for effecting the engagement of the lug on said disk with the recess in said spindle, and means for supporting said disk during the advance movement thereof.

References Cited in the file of this patent

UNITED STATES PATENTS

| | | |
|---|---|---|
| 1,462,305 | Snyder | July 17, 1923 |
| 1,881,533 | Hardiman | Oct. 11, 1932 |
| 2,004,464 | Clarkson | June 11, 1935 |
| 2,349,456 | Olson | May 23, 1944 |